(12) United States Patent
Kull et al.

(10) Patent No.: US 6,435,624 B1
(45) Date of Patent: Aug. 20, 2002

(54) RAILWAY LOCOMOTIVE BRAKE CONTROLLER

(75) Inventors: Robert C. Kull, Olney, MD (US); Robert D. Dimsa, Jefferson Hills, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/849,738

(22) Filed: May 4, 2001

(51) Int. Cl.[7] .......................... B61L 23/00; B60T 13/00
(52) U.S. Cl. ........................... 303/15; 303/7; 303/3; 303/16
(58) Field of Search ............... 303/7, 8, 3, 15, 303/20, 33, 47, 16; 246/182 R, 167 R, 187 C, 182 B, 169 R; 340/933, 3.1; 307/131, 151; 701/70; 105/61

(56) References Cited

U.S. PATENT DOCUMENTS

| | | |
|---|---|---|
| 4,105,189 A | 8/1978 | Beall |
| 4,344,138 A | 8/1982 | Frasier |
| 4,687,258 A | 8/1987 | Astley |
| 5,064,251 A | 11/1991 | Romansky |
| 5,172,316 A | 12/1992 | Root et al. |
| 5,383,717 A | 1/1995 | Fernandez et al. |
| 5,503,469 A | 4/1996 | Cunkelman |
| 5,630,565 A | 5/1997 | Lumbis |
| 5,681,015 A | 10/1997 | Kull |
| 5,856,788 A | 1/1999 | Walter et al. |
| 5,959,568 A | 9/1999 | Woolley |
| 5,984,427 A | 11/1999 | Kettle, Jr. |
| 6,607,485 | 5/2000 | Balukin et al. |
| 6,163,089 A * | 12/2000 | Kull ........................... 307/151 |
| 6,217,126 B1 * | 4/2001 | Kull ............................... 303/3 |

* cited by examiner

Primary Examiner—Douglas C. Butler
(74) Attorney, Agent, or Firm—Buchanan Ingersoll, P.C.

(57) ABSTRACT

An integrated locomotive braking and ECP braking control on a lead locomotive for implementing braking effort on all locomotives in a manner relative to braking effort applied on ECP freight cars. On the lead locomotive, a data interface can be established between an head-end-unit and a brake controller. The head-end-unit can electrically signal each ECP freight car to carry out braking commands. The integrated brake control can include a CPU, as part of either the brake controller or the head-end-unit, which can be programmed to provide braking effort on the lead locomotive relative to the braking effort applied on the ECP freight cars. The braking on the lead locomotive is implemented by the brake controller by controlling the independent brake relative to the braking effort commanded on the ECP freight cars. The independent brake on non-ECP trailing locomotives is connected to the lead locomotive independent brake via a standard independent brake pneumatic connection. As a result, the same braking effort applied on the lead locomotive via the independent brake is automatically implemented on the non-ECP trailing locomotives via the independent brake pneumatic connection such that all locomotives are braked relative to braking on the ECP freight cars.

7 Claims, 2 Drawing Sheets

RAILWAY LOCOMOTIVE BRAKE CONTROLLER

BACKGROUND

Figure 1:
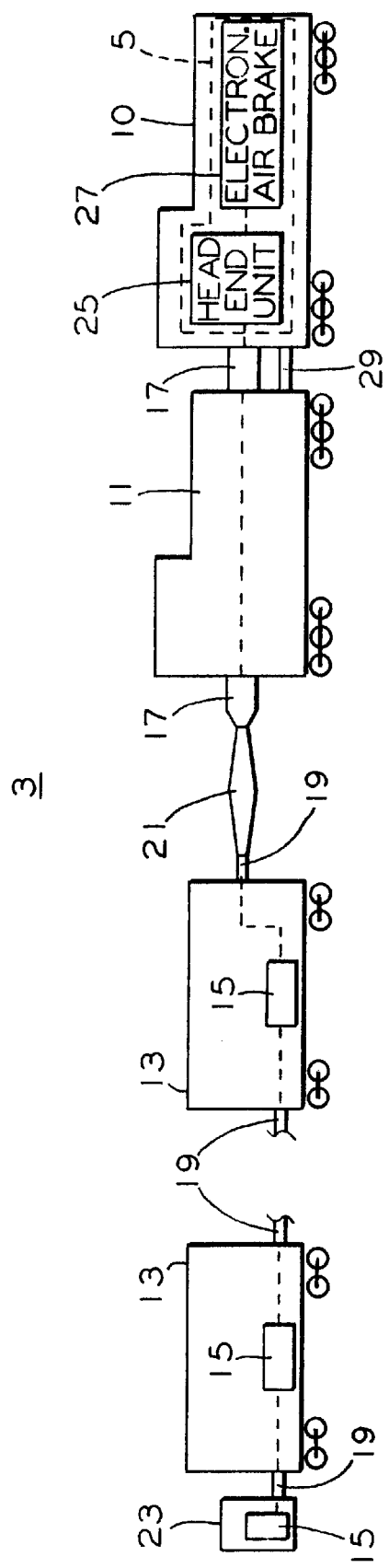

This invention relates generally to Electrically Controlled Pneumatic ("ECP") freight train braking systems, and more particularly, to a braking system for a locomotive consist wherein braking on non-ECP equipped trailing locomotives can be controlled from an ECP equipped lead locomotive in a manner relative to the braking being applied to ECP freight cars. Early applications of new ECP brake systems have been applied as overlays to conventional pneumatic brake systems. As an overlay, applications of ECP car brakes do not apply ECP braking action on all locomotives of a consist. Conventional locomotive air brake systems initiate a brake application on the locomotive anytime a train brake application is made. However, it is typical for the engineer to manually "bail," i.e. release, the locomotive brake cylinder pressure to prevent run-in of the cars, which occurs because the cars tend to brake at a slower rate than the locomotives. However, in ECP brake systems, brake applications on each rail car occur at the same time, thus substantially reducing the "run-in" problem. Therefore, it would be acceptable in ECP braking to provide braking performance on the individual locomotives of a consist in the same manner as applied to the rail cars. Additionally, this would provide greater overall train braking performance, especially for short trains, without the slack action problems associated with conventional pneumatic braking.

Accordingly, there is a need for a system to provide braking effort on the full consist of locomotives in the same manner as the braking effort applied to ECP cars. Moreover, this is preferably done with only the lead locomotive of a multiple locomotive consist having to be equipped with ECP compatible head-end-unit hardware.

SUMMARY

According to the invention, integrated locomotive braking control and ECP braking control is provided on a lead locomotive such that braking effort on non-ECP equipped trailing locomotives is applied in a manner relative to the braking effort applied on the BCP freight cars in the train. In such an integrated brake control, a data interface can be established on the lead locomotive between a head-end-unit and a brake controller. The brake controller can be a conventional "electronic air brake" controller. In ECP braking, the brake handle is interfaced to the electronic air brake for communicating brake commands to the head-end-unit which electrically conveys the brake commands to the ECP freight cars. In ECP braking, the electronic air brake does not reduce brake pipe pressure in response to handle positions as occurs in conventional pneumatic braking.

The integrated brake control can be programmed to provide lead locomotive brake cylinder pressure with a build-up pressure and charge rate to provide locomotive braking effort relative to the braking effort applied on the ECP freight cars. The programmable control can be implemented through a central processing unit ("CPU") which can be part of the EAB or the head-end-unit. Brake pipe pressure is not altered in ECP braking such that non-ECP trailing locomotives are not braked in this manner. Therefore, to implement braking on non-ECP equipped trailing locomotives, the integrated brake control provides for the EAB on the lead locomotive to control braking on the lead locomotive via the locomotive independent brake. Conventionally, the independent brake on the lead locomotive is connected to the independent brake on trailing locomotives via a standard independent brake pneumatic connection. As a result, the independent brake on trailing locomotives is controlled from the independent brake on the lead locomotive which implements braking effort on the trailing locomotives relative to the braking effort applied on the lead locomotive and the ECP freight cars.

Other details, objects, and advantages of the invention will become apparent from the following detailed description and the accompanying drawings figures of certain embodiments thereof.

BRIEF DESCRIPTION OF THE DRAWING FIGURES

Figure 2:
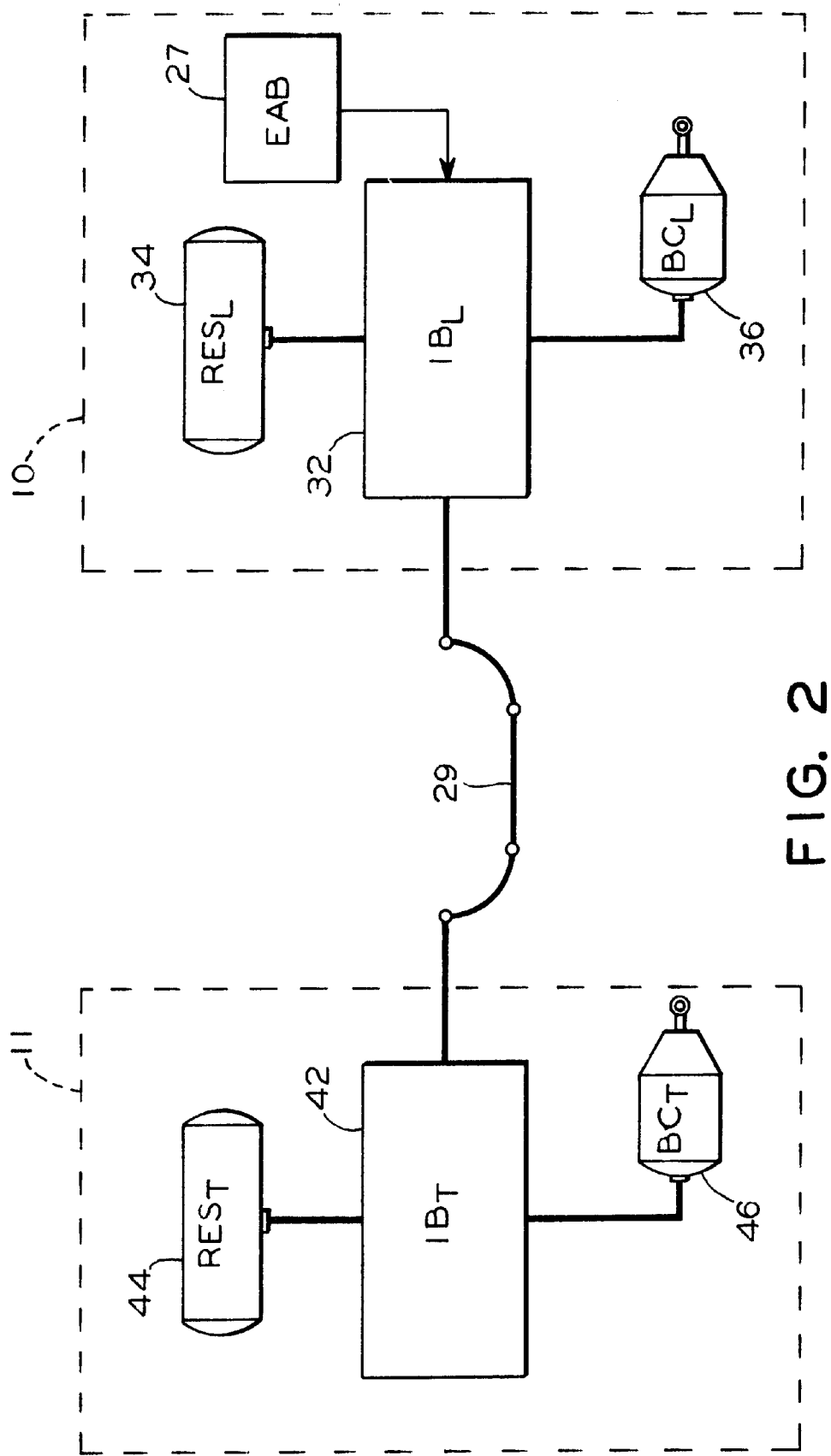

A more complete understanding of the invention can be obtained by considering the following detailed description in conjunction with the accompanying drawings, in which:

FIG. 1 is a schematic diagram of an ECP freight train having an integrated ECP and locomotive independent braking control system according to the invention; and FIG. 2 is a schematic diagram of illustrating a lead locomotive brake system pneumatically connected with a trailing locomotive brake system via a conventional independent brake application and release pipe.

DETAILED DESCRIPTION OF CERTAIN EMBODIMENTS

Referring now to the drawing figures wherein like reference numbers refer to similar parts throughout the several views, an ECP train 3 having an integrated brake control system ("IBC") 5 on board the lead locomotive 10 is shown in FIG. 1. The train 3 includes a trailing locomotive 11 and a number of ECP cars 13. Although only one trailing locomotive 11 is shown, more could be employed. Likewise, a typical such train 3 may have over one hundred ECP cars 13, only two of which are shown simply for convenience and for purposes of description. Each locomotive 10, 11, as with all conventional locomotives, has a conventional "multiple unit" ("MU") cable 17, which is connectable to the MU cable 17 on other locomotives. According to the invention, the MU cable 17 can also be connected to the ECP trainline 19 via an interface adapter 21. Additionally, the ECP trainline 19 interconnects each car 13 for the transmission data to and from the ECP equipment 15 on-board each car 13.

In regard to a non-ECP equipped locomotive 11, because such locomotives are not equipped with an ECP trainline 19, the interface adapter 21 is necessary in order to convey ECP data from the ECP equipped lead locomotive 10 to the ECP cars 13 through the non-ECP locomotive 11 via the MU cable 17. Such an interface adapter 21 is described in commonly owned U.S. Pat. No. 6,163,089, which is hereby incorporated herein by reference.

According to one embodiment of the invention, a head-end-unit ("HEU") 25 can be used only on the lead locomotive 10. The lead locomotive 10 can also include a locomotive electronic air brake ("EAB") controller 27. The EAB 27 can include a programmable central processor and memory. The EAB 27 can also have a brake handle (not shown) which can be rotated by a train engineer just like the conventional brake handle that has historically been used to adjust brake pipe pressure to control the train brakes in the conventional manner. However, in this case, the rotation of the brake handle is converted by the EAB 27 to correspond to a selected amount by which the brake cylinder pressure on the freight cars is to be increased or decreased. The amount of adjustment in pressure is relative to the distance and direction the brake handle is rotated. An example of an EAB 27 is the EPIC™ controller, which is available from Westinghouse Airbrake Technologies Company.

The train 3 can further be provided with an end-of-train unit ("EOT") 23 including ECP equipment 15 for communicating through the ECP trainline 19. The EOT 23 can also include radio frequency communications ability for communicating in that manner with a similarly functional HEU 25 on the lead locomotive 10.

To implement the IBC 5, a data interface, preferably a serial data interface, is established between the HEU 25 and the EAB 27 on the lead locomotive 10. Alternatively, the head-end-unit can be provided with a programmable central processor and memory for this purpose. In such case, an EAB 27 would not be necessary and some other alternative brake control on the lead locomotive 10 can be provided to interface with the HEU 25 to control independent braking of the lead locomotive 10. In the preferred case however, when interfaced with the HEU 25, the EAB 27 communicates brake request commands to the HEU 25 which then electrically transmits the brake commands to the freight cars 13. The EAB 27 thus does not reduce brake pipe pressure in response to handle positions, as in conventional pneumatic brake control operation. Rather, the brake pipe pressure is maintained at the preset train operating pressure, which is nominally 90 to 110 psi.

To control the braking the lead locomotive 10, the EAB system 27 CPU on the lead locomotive 10 can be programmed to control the lead locomotive 10 brake cylinder pressure with a build-up pressure and charge rate to provide braking performance relative to that commanded for the ECP cars 13. The HEU 25 can signal the ECP cars 13 to brake according to a selected profile and the EAB 27 can control the lead locomotive 10 to brake in a relative manner. However, this manner of controlling the lead locomotive 10 brakes will not institute any corresponding braking action on the trailing locomotive 11. This is because the trailing locomotive 11 is normally equipped with only the basic EAB 27, or pneumatic only (26 style) brake equipment, which, in either case, is not capable of receiving the ECP brake commands transmitted to the rail cars 13 via the ECP trainline 19.

Referring to FIG. 2, there is shown pertinent portions of the braking systems of the lead locomotive 10 and the trailing locomotive 11. Each locomotive 10, 11 conventionally includes an independent brake valve 32, 42, respectively, which can control the pressure in a brake cylinder 36 and 46, respectively. Pressure in the brake cylinder 36, 46 can be increased by connecting the brake cylinder 36, 46 to a pressurized reservoir 34, 44, respectively. Alternatively, pressure in the brake cylinder 36, 46 can be decreased by connecting it to the atmosphere. According to AAR standards, lead 10 and trailing 11 locomotives are pneumatically connected by an "independent application and release pipe" 29, which is commonly referred to as the "20-pipe." The braking effort applied by a trailing locomotive 11 is conventionally controlled by the independent brake valve 42 by detecting and responding to pneumatic signals propagated in the 20-pipe 29 by the independent brake valve 32 on the lead locomotive 10.

In conventional, non-ECP brake systems, the lead locomotive 10, in addition to implementing pneumatic signals to the rail cars via pressure changes in the brake pipe, also implements pneumatic signals in the 20-pipe 29, which can be detected by any trailing locomotive 11 which is connected to the 20-pipe 29. The independent brake valve 42 on the trailing locomotive 11 controls the pressure in the brake cylinder 46 according to the pressure changes sensed in the 20-pipe 29. As stated above, in ECP braking there is no change implemented in brake pipe pressure. Likewise, there is also no pressure change in the 20-pipe 29. Consequently, ECP brake applications from the lead locomotive 10 will not be detected by the independent brake valve 46 on the trailing locomotive 11.

Therefore, another manner of controlling the braking on the trailing locomotive 11 must be provided. According to the invention, braking on the trailing locomotive 11 can be provided by controlling the pressure in the 20-pipe 29 which is detectable by the independent brake valve 42 on the trailing locomotive 11. The independent brake valve 42 can then control the pressure in the brake cylinder 46 in the conventional manner.

Thus, the EAB 27 on the lead locomotive 10, in addition to electrically signaling the brake commands to the ECP equipped cars, can also control the independent brake valve 32 on the lead locomotive 10 to implement a corresponding pneumatic signal in the 20-pipe 29. This pneumatic signal in the 20-pipe 29 can be detected by the independent brake valve 42 on the trailing locomotive 11 and used to provide a corresponding pressure in the brake cylinder 46 in a conventional manner. As a result, the EAB 27 can control the independent brake valve 42 on the trailing locomotive 11 to initiate a braking application rate and level on the trailing locomotive 11 which provides braking effort relative to that being applied on the ECP cars 13 and the lead locomotive 10.

Additionally, the train operator would still be able to bail the brakes on either locomotive 10, 11 if desired, or if needed for special train handling conditions. To accomplish this, the EAB 27 on the lead locomotive 10 could sense a pressure increase in the 20-pipe 29 and release the brakes on the trailing locomotive 11. In normal practice however, releasing the locomotive brakes would likely not be necessary, due to the uniform and time-synchronized braking effort being applied to both the locomotive consist 10, 11 and each freight car 13 in the train 3.

An IBC 5 according to the invention thus advantageously enables an ECP equipped lead locomotive 10 to provide braking effort on any trailing, non-ECP equipped locomotive 11. Moreover, all locomotives 10, 11 can be braked at a rate and level relative to that applied to each ECP freight car 13. This results in a beneficial increase in total train braking effort, which is particularly significant for short, lightweight trains with multiple locomotives. Moreover, in-train forces, which result from different parts of the train being braked with different forces, are also significantly reduced.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A railway locomotive brake control apparatus on a freight train having at least one ECP equipped freight car, an ECP equipped lead locomotive and at least one trailing locomotive, each locomotive having an independent brake valve and each locomotive being pneumatically interconnected via an independent application and release pipe therebetween, said locomotive brake control apparatus comprising:

a. a brake controller on said lead locomotive for electrically communicating signals indicative of at least brake commands to said at least one ECP equipped freight car;

b. said brake controller controlling said independent brake valve on said lead locomotive to implement braking effort on said lead locomotive relative to braking effort on said at least one ECP equipped freight car resulting from said signals; and d. said brake controller controlling said independent brake valve on said at least one trailing locomotive via said independent application and release pipe to implement braking effort on said at least one trailing locomotive relative to said braking effort on said at least one ECP equipped freight car.

2. The locomotive brake control apparatus of claim 1 wherein said brake controller on said lead locomotive further comprises a head-end-unit.

3. The locomotive brake control apparatus of claim 2 wherein said brake controller on said lead locomotive further comprises:

a. an electronic air brake controller; and b. said head-end-unit communicating said signals with said electronic air brake controller.

4. The locomotive brake control apparatus of claim 3 wherein said electronic air brake controller controls said independent brake valve on said lead locomotive and said independent brake valve on said trailing locomotive via said independent application and release pipe.

5. The locomotive brake control apparatus of claim 1 wherein said lead locomotive and said at least one trailing locomotive are each equipped with a locomotive MU cable, and said at least one ECP car has an ECP trainline, said locomotive brake control apparatus further comprising:

a. an interface adapter interconnecting said ECP trainline with said MU cable on said at least one trailing locomotive; and b. said signals conveyed between said at least one ECP car and said lead locomotive through said ECP trainline and said MU cable via said interface adapter.

6. A railway locomotive brake control method for a freight train having at least one ECP equipped freight car, an ECP equipped lead locomotive and at least one trailing locomotive, each locomotive having an independent brake valve and each locomotive being pneumatically interconnected via an independent application and release pipe therebetween, said locomotive brake control method comprising:

a. electrically communicating signals indicative of at least brake commands from said lead locomotive to said at least one ECP equipped freight car;

b. controlling said independent brake valve on said lead locomotive to implement braking effort on said lead locomotive relative to braking effort on said at least one ECP equipped freight car resulting from said electrically communicated signals; and c. controlling said independent brake valve on said at least one trailing locomotive via said independent application and release pipe to implement braking effort on said at least one trailing locomotive relative to said braking effort on said at least one ECP equipped freight car.

7. The locomotive brake control method of claim 6 wherein said lead locomotive and said at least one trailing locomotive are each equipped with a locomotive MU cable, and said at least one ECP equipped freight car has an ECP trainline, said locomotive brake control method further comprising:

a. interfacing said MU cable on said at least one trailing locomotive with said ECP trainline; and b. conveying said signals between said lead locomotive and said at least one ECP equipped freight car through said ECP trainline and said MU cable via said interface adapter.

* * * * *